Aug. 7, 1951     O. H. WELCH     2,563,294
SCORING DEVICE
Filed Jan. 17, 1950     2 Sheets-Sheet 1
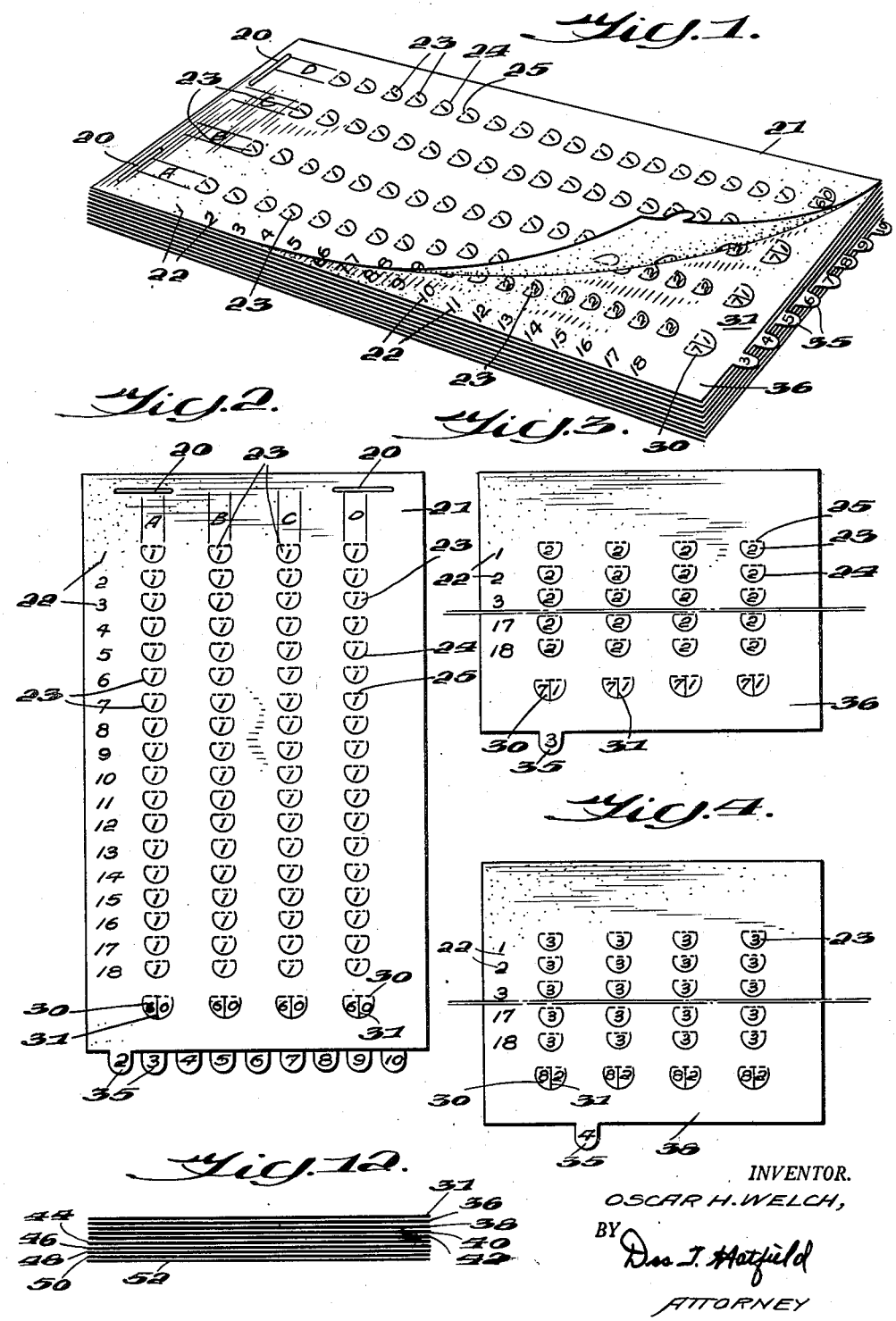
INVENTOR.
OSCAR H. WELCH,
BY
Dan T. Hatfield
ATTORNEY Aug. 7, 1951  O. H. WELCH  2,563,294
SCORING DEVICE
Filed Jan. 17, 1950  2 Sheets-Sheet 2
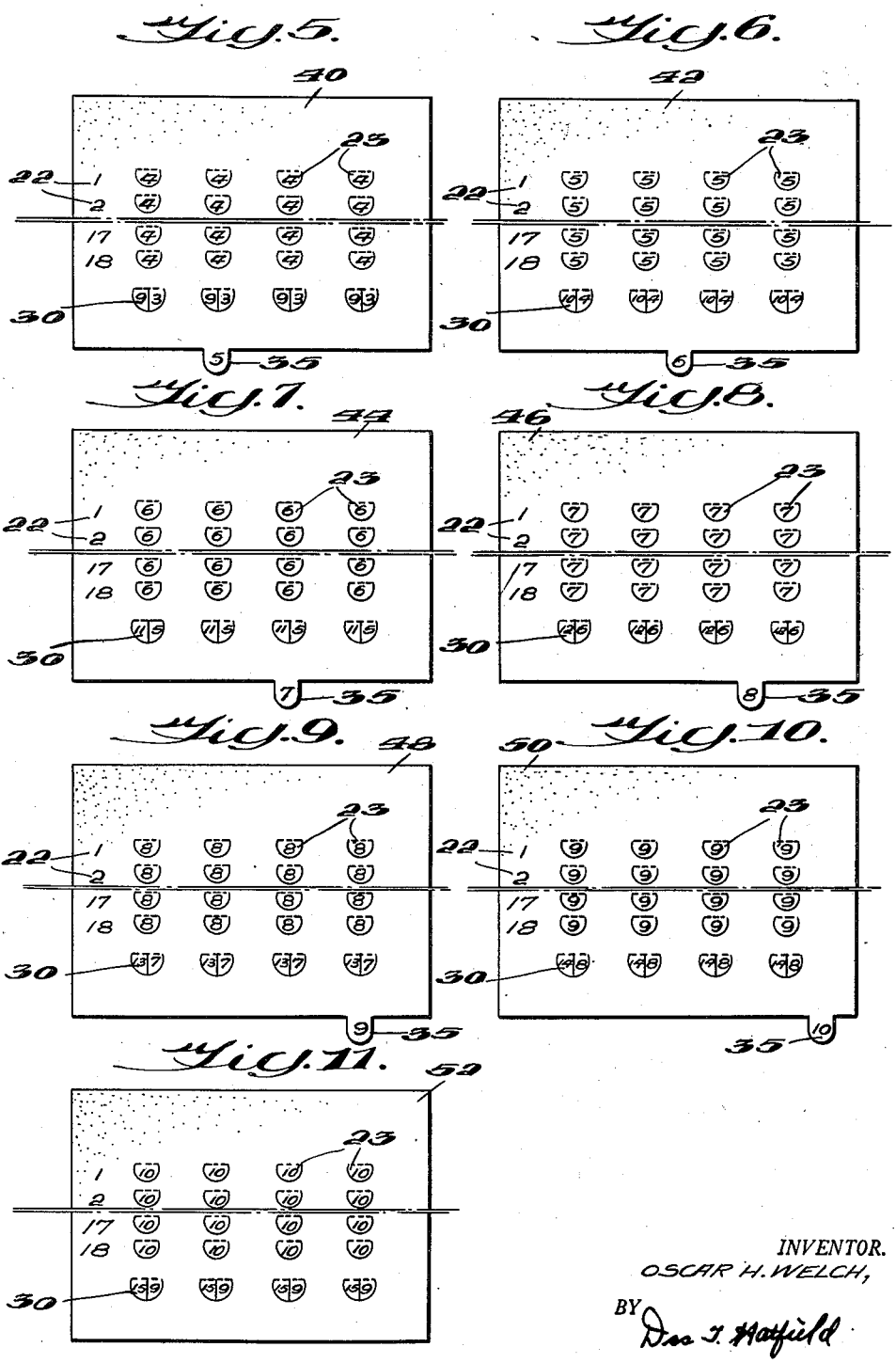
INVENTOR.
OSCAR H. WELCH,
BY
ATTORNEY Patented Aug. 7, 1951

2,563,294

UNITED STATES PATENT OFFICE 2,563,294

SCORING DEVICE

Oscar H. Welch, John Day, Oreg.

Application January 17, 1950, Serial No. 139,033

10 Claims. (Cl. 283—50)

This invention relates to a game scoring device.

The main object of this invention is to provide a device wherein individual and total scores of a game may be permanently recorded without the necessity of using a scriber in connection therewith.

Other objects, of course, will be apparent from the disclosure.

In the drawings,

Figure 1 is a perspective view of the scoring device;

Figure 2 is a top plan view of the scoring device;

Figure 3 is a top plan view, with portions cut away, of the second sheet of the scoring device;

Figure 4 is a top plan view, with portions cut away, of the third sheet of the scoring device;

Figure 5 is a top plan view, with portions cut away, of the fourth sheet of the scoring device;

Figure 6 is a top plan view, with portions cut away, of the fifth sheet of the scoring device;

Figure 7 is a top plan view, with portions cut away, of the sixth sheet of the scoring device;

Figure 8 is a top plan view, with portions cut away, of the seventh sheet of the scoring device;

Figure 9 is a top plan view, with portions cut away, of the eighth sheet of the scoring device;

Figure 10 is a top plan view, with portions cut away, of the ninth sheet of the scoring device;

Figure 11 is a top plan view, with portions cut away, of the tenth sheet of the scoring device; while Figure 12 is a side view of the device.

While the scoring device forming the subject matter of this invention has been illustrated in the drawings as a score pad for the game of golf, primarily because the invention is ideally suitable for recording golf scores, it will, of course, be understood that the invention may be modified so as to be suitable for recording scores of other games, such as bowling, tennis, and the like.

At the present time, golf scores are recorded on a card by means of a pencil. While there is no problem in recording golf scores in this manner, if the scorer is always supplied with a pencil, nevertheless, it frequently happens that the pencil is lost some place on the golf course, or the point becomes broken while in the scorer's pocket, due to the physical activity of the scorer. There are, of course, other problems involved in requiring a golfer to carry a pencil. Suffice it to say, however, that these problems are eliminated by the present invention.

As noted in Figs. 1 and 2, the invention takes the form of a book or pad of paper or other suitable flexible material which may be torn or otherwise mutilated. Preferably, the book is composed of ten sheets of paper which are secured together in book form by any suitable means, such as staples, shown at 20. The outermost sheet 21 is provided with a column of printed numerals indicated at 22, which numerals preferably run from 1 through 18 and are intended to represent the number of holes on the usual eighteen-hole golf course. Also, there are a plurality of rows of tabs indicated by reference numeral 23. These tabs are formed integrally with the paper sheet 21 and, preferably, the arcuate portion 24 of the tabs 23 are severed from the sheet while the upper horizontal portion 25 of the tabs are perforated. It should be noted that the four columns or rows of tabs 23 shown in Figures 1 and 2 are vertically arranged, and each tab of each row is in vertical alignment with each other. It should also be noted that the top row of tabs in each column are horizontally aligned, and the horizontal alignment of each row is in horizontal alignment with the column of printed numerals 22. Each of the tabs 23 on the outermost sheet 21 have a numeral thereon which, in this instance, is the numeral 1.

Positioned adjacent the lower portion of sheet 21 are totaling tabs 30, there being a totaling tab for each vertical tab row. The totaling tabs 30 are also formed integrally with sheet 21 and are severed in its arcuate portion from the sheet in the same manner as aforementioned in connection with tabs 23. Also, the upper horizontal portion of the totaling tabs are preferably perforated, again in a manner similar to that mentioned in connection with tabs 23. In addition, the totaling tabs are severed, as indicated at 31, so as to cut the totaling tabs in half, and thus form two half tabs. The totaling tabs have two numerals thereon, the numerals being of different denominations. As illustrated, the totaling numerals on sheet 21 comprise the numeral 6 on the left hand half tab and the numeral 0 on the right hand half tab.

Further, the outermost sheet 21 has an index tab indicated at 35, which may be formed integrally with the sheet 21, as illustrated, or of course may be a separate tab element and secured to the sheet 21 in any suitable known manner. The index tab has the reference numeral 2 thereon.

In Fig. 1, it will be noted that the lower left hand corner of the outermost sheet 21 has been turned upwardly so as to expose a portion of the next undermost sheet 36, which sheet has a portion thereof illustrated in Fig. 3. Sheet 36 is formed identically as sheet 21, the only exception being the indicia appearing on the tabs 23, totaling tabs 30 and index tab 35. On second sheet 36, it will be noted that each row of tabs have the numeral 2 thereon, the totaling tabs having the numeral 7 on the left hand tab and the numeral 1 on the right hand half tab. The third sheet 38 is partially illustrated in Fig. 4, this sheet also being constructed in an identical manner as sheets 21 and 36. The only difference between sheet 38 and the aforementioned sheets is the indicia appearing on the tabs of the rows, totaling tabs, and the index tab. On the third sheet 38, it will be noted that the numeral 3 appears on all of the tabs 23, while the numeral 8 appears on the left hand half tab of totaling tab 30 and the numeral 2 appears on the right hand half tab.

As illustrated in Figs. 5 through 11, the subsequent sheets 40, 42, 44, 46, 48, 50 and 52 are also constructed in an identical manner as that previously mentioned in connection with sheets 21, 36 and 38. The indicia, however, on each of the subsequent sheets has a consecutively higher number on the vertical rows of tabs and a consecutively higher number on each half of the totaling tabs. Thus, as shown in Fig. 5, the fourth sheet has a reference numeral 4 on the vertical row of tabs and the reference numerals 9 and 3 on the left and right hand half tabs, respectively, of the totaling tabs. The fifth sheet shown in Fig. 6 has the reference numeral 5 on all of the tabs of the vertical rows, while the numerals 10 and 4 appear on the left and right hand half tabs, respectively, of the totaling tabs. Fig. 7 shows the sixth sheet and the numeral 6 appears on all of the tabs of the vertical rows, while the numerals 11 and 5 appear on the left and right hand half tabs, respectively, of the totaling tabs. Fig. 8 shows the seventh sheet and the numeral 7 appears on all of the tabs of the vertical rows, while the numerals 12 and 6 appear on the left and right hand half tabs, respectively, of the totaling tabs. Fig. 9 shows the eighth sheet and the numeral 8 appears on all of the tabs of the vertical rows, while the numerals 13 and 7 appear on the left and right hand half tabs, respectively, of the totaling tabs. Fig. 10 shows the ninth sheet and the numeral 9 appears on all of the tabs of the vertical rows, while the numerals 14 and 8 appear on the left and right hand half tabs, respectively, of the totaling tabs. Fig. 11 shows the tenth sheet and the numeral 10 appears on all of the tabs of the vertical rows, while the numerals 14 and 9 appear on the left and right hand half tabs, respectively, of the totaling tabs.

It should also be noted, in Figures 5 through 10, that the index tabs 35 have a consecutively higher numeral thereon, i. e., the numeral 5 on the fourth sheet, 6 on the fifth sheet, 7 on the sixth sheet, 8 on the seventh sheet, 9 on the eighth sheet, 10 on the ninth sheet. It is unnecessary to have an index on the last or bottom sheet 52.

Referring again to Figs. 1 and 2, it should be noted that suitable lines are provided at the top of sheet 21 to insert the name of a player of a golf foursome. In utilizing the device as a golf score card, let us assume that players A, B, C, and D's scores of a golf foursome are to be kept in the vertical rows of tabs appearing from left to right. Let us also assume that par for the first, second and third holes of the course is 4, 3, 5. If player A obtains a 4 on the first hole, the scorer would grasp index tab 4 and raise the same from the book, thus raising the first three sheets of the book. Thereafter, the scorer would place his index finger under the stack of tabs 23 appearing in A's column, opposite the printed numeral 1, and by exerting a slight upward pressure, the tabs overlying each other on the first, second and third sheets of the book will be raised and, with the other hand, the scorer will remove these three tabs by tearing the same from the book. In removing these three tabs from the first, second and third sheets, the reference numeral 4 appearing on the fourth sheet, i. e., sheet 40, will appear. Then let us assume that player B had a 6 on the first hole. The scorer would grasp the index tab 35 having the numeral 6 thereon and raise the same from the book. In this manner, the first five sheets, i. e., sheets 21, 36, 38, 40 and 42, would be separated from the remaining sheets. The scorer would then place his index finger under the top stack of tabs in B's row or column and, again, by a slight upward pressure, the first five tabs would be raised from the plane of their respective sheets. The scorer would then tear off these five tabs and the numeral 6 on the sixth sheet, i. e., sheet 44, shown in Fig. 7, would appear. The manner of scoring C and D's scores in their respective columns would be accomplished similarly.

On the second hole, which we have assumed is a par 3, let us imagine that player A performs the unusual feat of scoring a hole-in-one or ace. Accordingly, his score for the second hole would be 1 and, hence, the scorer would not remove any tabs of A's column opposite the printed numeral 2, so that the numeral 1 would appear opposite the printed numeral 2 to indicate the score 1 for A on the second hole. The scoring would continue in the manner previously mentioned until all eighteen holes had been played. Thus, if A's score was 76, which score would be the total of the numerals appearing in A's column, the scorer would then first raise only the outermost sheet 21 wherein the numeral 7 appears in the left hand half tab of totaling tab 30. By removing the left hand half tab of sheet 21, thus removing the numeral 6, a 7 would then appear. Thereafter, the scorer would then raise six sheets, i. e., the outermost sheet 21 and continuing until sheet 44 had been raised, and thereafter tear off the stack of right hand half tabs of the totaling tab in A's column so that the numeral 6 would show on sheet 46. Thus, the total of A's score, 76, would appear in the totaling tab.

If player B scored an 80 for the eighteen holes, which score would be obtained by adding the total of the numerals appearing in B's column, the scorer would then raise the first two sheets only and remove two left hand half tabs of the totaling tabs, so that the numeral 8, as shown in Fig. 4, would appear. There would be no right hand tabs removed and thus the total 80 would be shown. A similar procedure would be followed to show the totals of C and D's scores.

It will be understood, of course, that the score device as illustrated could easily be changed so as to provide a score pad for only nine holes, by eliminating the printed numerals 10 through 18 and the respective tabs appearing opposite these numerals. Under such circumstances, the numerals appearing on the totaling tabs would be changed so that, for instance, on the outermost sheet 21, the numerals 3 and 0 would be shown rather than the 6 and 0 as illustrated. The subsequent totaling tabs on the following sheets would be changed to read 4—1, 5—2, 6—3, etc., rather than as shown.

It will also be understood, of course, that if the scoring device is to be used for some other game than golf, suitable indicia representing the individual scores and totaling scores would replace the indicia shown. If the device is to be used for keeping golf scores, a cover sheet or holder could be provided for the book so that the local rules of the particular course could be printed thereon and, if desired, suitable advertising could also appear. Further, the sheets forming the book could be wider than that as illustrated so that there would be ample room to place the yardage of each particular hole and handicap numerals opposite each hole, if desired.

Where it has been mentioned that the tabs forming the vertical rows and totaling tabs have a portion which is severed from their respective sheets, it will, of course, be understood that the tabs could be scored in any suitable manner rather than severing the same, or they could be perforated. In any event, the purpose of the severing, perforating, or scoring is to enable the scorer to easily remove one or more of the tabs. Of course, the above is also applicable to the vertical severance previously mentioned in connection with the totaling tabs. Accordingly, when the term severed appears in the claims, the term is intended to cover any type of deformation of the sheets to form the tabs. The index tabs 35 are unnecessary to practice the invention, but they are provided in the preferable form of the invention so that the scorer may quickly raise the requisite number of sheets in performing the scoring operation.

I claim:

1. A scoring device comprising a plurality of sheets of paper arranged in book form, each sheet of paper having at least one row of tabs, the row of tabs on one sheet overlying the row of tabs on the next under sheet, each tab having indicia thereon, the indicia of each tab of the subsequent under sheets being different from the indicia on the tabs of the first sheet and from each other sheet, all of the sheets being arranged so that indicia is in consecutive order, said tabs having a portion thereof which is severed from its sheet so that a tab may be easily removed from its sheet to expose the indicia on the tab on the next under sheet.

2. A scoring device comprising a plurality of sheets of paper arranged in book form, each sheet of paper having a plurality of rows of tabs, the rows of tabs on one sheet overlying the rows of tabs on the next under sheet, each tab having indicia thereon, the indicia on each tab of the same sheet being the same while the indicia of each tab of the subsequent under sheets being different from the indicia on the tabs of the first sheet and from each other sheet, all of the sheets being arranged so that the indicia is in consecutive order, said tabs having a portion thereof which is severed from its sheet so that a tab may be easily removed from its sheet to expose the indicia on the tab on the next under sheet.

3. A scoring device comprising a plurality of sheets of paper arranged in book form, each sheet of paper having a plurality of rows of tabs, the rows of tabs on one sheet overlying the rows of tabs on the next under sheet, each tab having indicia thereon, the indicia on each tab of the same sheet being the same while the indicia of each tab of the subsequent under sheets being different from the indicia on the tabs of the first sheet and from each other sheet, all of the sheets being arranged so that the indicia is in consecutive order, said tabs having a portion thereof which is severed from its sheet so that a tab may be easily removed from its sheet to expose the indicia on the tab on the next under sheet, and a plurality of totaling tabs on each sheet, one of said totaling tabs being positioned adjacent each row of tabs and carrying indicia thereon, the totaling tabs on one sheet overlying the totaling tabs on the next under sheet, said totaling tabs having indicia thereon, said totaling tabs also having a portion thereof which is severed from its sheet so that a totaling tab may be easily removed from its sheet to expose the indicia on the totaling tab on the next under sheet.

4. A scoring device comprising a plurality of sheets of paper arranged in book form, each sheet of paper having a plurality of rows of tabs, the rows of tabs on one sheet overlying the rows of tabs on the next under sheet, each tab having indicia thereon, the indicia on each tab of the same sheet being the same while the indicia of each tab of the subsequent under sheets being different from the indicia on the tabs of the first sheet and from each other sheet, all of the sheets being arranged so that the indicia is in consecutive order, said tabs having a portion thereof which is severed from its sheet so that a tab may be easily removed from its sheet to expose the indicia on the tab on the next under sheet, a plurality of totaling tabs on said sheet, said totaling tabs being severed to divide the same into two half tabs so as to permit either or both half tabs to be removed from its sheet.

5. A scoring device comprising a plurality of sheets of paper arranged in book form, each sheet of paper having a plurality of rows of tabs, the rows of tabs on one sheet overlying the rows of tabs on the next under sheet, each tab having indicia thereon, the indicia on each tab of the same sheet being the same while the indicia of each tab of the subsequent under sheets being different from the indicia on the tabs of the first sheet and from each other sheet, all of the sheets being arranged so that the indicia is in consecutive order, said tabs having a portion thereof which is severed from its sheet so that a tab may be easily removed from its sheet to expose the indicia on the tab on the next under sheet, and a plurality of totaling tabs on each sheet, one of said totaling tabs being positioned adjacent each row of tabs and carrying indicia thereon, the totaling tabs on one sheet overlying the totaling tabs on the next under sheet, said totaling tabs having indicia thereon, said totaling tabs also having a portion thereof which is severed from its sheet so that a totaling tab may be easily removed from its sheet to expose the indicia on the totaling tab on the next under sheet, and index tabs secured to at least some of said sheets.

6. A scoring device comprising a plurality of sheets of paper arranged in book form, each sheet of paper having a plurality of spaced vertically arranged rows of tabs, the vertical rows of tabs on each sheet being in alignment with each other, each tab having indicia thereon, the indicia on each tab of the same sheet being the same while the indicia of each tab of the subsequent under sheets being different from the indicia on the tabs of the first sheet and from each other sheet, all of the sheets being arranged so that the indicia is in consecutive order, said tabs having a portion thereof which is severed from its sheet so that a tab may be easily removed from its sheet to expose the indicia on the tab on the next under sheet, and a plurality of totaling tabs on each sheet, each of said totaling tabs being positioned in vertical alignment with its row of tabs and carrying indicia thereon, the totaling tabs on each sheet being in alignment with each other, said totaling tabs having indicia thereon, said totaling tabs also having a portion thereof which is severed from its sheet so that a totaling tab may be easily removed from its sheet to expose the indicia on the totaling tab on the next under sheet.

7. A golf scoring device comprising a plurality of sheets of paper arranged in book form, each sheet of paper having formed integrally therewith a plurality of spaced vertically arranged rows of tabs, each tab of a vertical row being arranged in horizontal alignment with each corresponding tab of the other vertical rows, the vertical rows of tabs on each sheet being in alignment with each other, each tab on the outermost sheet having the same numeral thereon and each tab of each of the subsequent under sheets having the same numeral thereon, the tabs of the subsequent under sheets having a consecutively higher numeral thereon, said tabs having a portion thereof which is severed from its sheet so that a tab on the outermost sheet and underlying aligned tabs on underlying subsequent sheets may be easily removed so as to expose the numeral on the first tab left remaining.

8. A golf scoring device comprising a plurality of sheets of paper arranged in book form, each sheet of paper having formed integrally therewith a plurality of spaced vertically arranged rows of tabs, each tab of a vertical row being arranged in horizontal alignment with each corresponding tab of the other vertical rows, the vertical rows of tabs on each sheet being in alignment with each other, each tab on the outermost sheet having the same numeral thereon and each tab of each of the subsequent under sheets having the same numeral threon, the tabs of the subsequent under sheets having a consecutively higher numeral thereon, said tabs having a portion thereof which is severed from its sheet so that a tab on the outermost sheet and underlying aligned tabs on underlying subsequent sheets may be easily removed so as to expose the numeral on the first tab left remaining, and a plurality of totaling tabs formed integrally with each sheet, one for each vertical row of tabs, each of the totaling tabs of a sheet being in alignment with the totaling tabs on subsequent sheets, each totaling tab being severed to form two half tabs, each of said half tabs on the outermost sheet having a numeral thereon of different denomination and each of the half tabs of the subsequent under sheets having a consecutively higher numeral thereon, each of said half tabs having a portion thereof which is severed from its sheet so that a half tab on the outermost sheet and underlying aligned half tabs on underlying subsequent sheets may be easily removed so as to expose the numeral on the first half tab left remaining.

9. A golf scoring device comprising a plurality of sheets of paper arranged in book form, each sheet of paper having formed integrally therewith a plurality of spaced vertically arranged rows of tabs, each tab of a vertical row being arranged in horizontal alignment with each corresponding tab of the other vertical rows, the vertical rows of tabs on each sheet being in alignment with each other, each tab on the outermost sheet having the same numeral thereon and each tab of each of the subsequent under sheets having the same numeral thereon, the tabs of the subsequent under sheets having a consecutively higher numeral thereon, said tabs having a portion thereof which is severed from its sheet so that a tab on the outermost sheet and underlying aligned tabs on underlying subsequent sheets may be easily removed so as to expose the numeral on the first tab left remaining, a plurality of totaling tabs formed integrally with each sheet, one for each vertical row of tabs, each of the totaling tabs of a sheet being in alignment with the totaling tabs on subsequent sheets, each totaling tab being severed to form two half tabs, each of said half tabs on the outermost sheet having a numeral thereon of different denomination and each of the half tabs of the subsequent under sheets having a consecutively higher numeral thereon, each of said half tabs having a portion thereof which is severed from its sheet so that a half tab on the outermost sheet and underlying aligned half tabs on underlying subsequent sheets may be easily removed so as to expose the numeral on the first half tab left remaining, and a vertical row of numerals printed on each sheet, each printed numeral of each row being in horizontal alignment with the tabs forming each vertical row, the tabs of the first sheet having the numeral one thereon and the vertical row of tabs on each subsequent sheet having a corresponding higher numeral.

10. A golf scoring device comprising a plurality of sheets of paper arranged in book form, each sheet of paper having formed integrally therewith a plurality of spaced vertically arranged rows of tabs, each tab of a vertical row being arranged in horizontal alignment with each corresponding tab of the other vertical rows, the vertical rows of tabs on each sheet being in alignment with each other, each tab on the outermost sheet having the same numeral thereon and each tab of each of the subsequent under sheets having the same numeral thereon, the tabs of the subsequent under sheets having a consecutively higher numeral thereon, said tabs having a portion thereof which is severed from its sheet so that a tab on the outermost sheet and underlying aligned tabs on underlying subsequent sheets may be easily removed so as to expose the numeral on the first tab left remaining, a plurality of totaling tabs formed integrally with each sheet, one for each vertical row of tabs, each of the totaling tabs of a sheet being in alignment with the totaling tabs on subsequent sheets, each totaling tab being severed to form two half tabs, each of said half tabs on the outermost sheet having a numeral thereon of different denomination and each of the half tabs of the subsequent under sheets having a consecutively higher numeral thereon, each of said half tabs having a portion thereof which is severed from its sheet so that a half tab on the outermost sheet and underlying aligned half tabs on underlying subsequent sheets may be easily removed so as to expose the numeral on the first half tab left remaining, a vertical row of numerals printed on each sheet, each printed numeral of each row being in horizontal alignment with the tabs forming each vertical row, the tabs of the first sheet having the numeral one thereon and the vertical row of tabs on each subsequent sheet having a corresponding higher numeral, and index tabs secured to at least some of said sheets, the index tab secured to the outermost sheet having the numeral two thereon and the index tabs secured to the subsequent under sheets having a consecutively higher numeral thereon.

OSCAR H. WELCH.

REFERENCES CITED

The following references are of record in the file of this patent:

UNITED STATES PATENTS

| Number | Name | Date |
| --- | --- | --- |
| 1,224,452 | Eaton | May 1, 1917 |
| 1,325,477 | Ketchum | Dec. 16, 1919 |

FOREIGN PATENTS

| Number | Country | Date |
| --- | --- | --- |
| 201,127 | Switzerland | Nov. 15, 1938 |